United States Patent [19]
Moffatt

[11] 3,896,320
[45] July 22, 1975

[54] HIGH SPEED ELECTRIC GENERATOR

[75] Inventor: E. Marston Moffatt, Glastonbury, Conn.

[73] Assignee: United Aircraft Corporation, East Hartford, Conn.

[22] Filed: Oct. 19, 1971

[21] Appl. No.: 190,509

[52] U.S. Cl. .............................. 310/64; 310/68 D
[51] Int. Cl.² ............................................ H02K 1/32
[58] Field of Search ........... 310/52, 64, 43, 55, 58, 310/65, 68, 68 D, 159, 261, 262, 264, 265, 85, 42, 215-218, 88, 233; 417/420; 174/110.1

[56] References Cited
UNITED STATES PATENTS

| | | | |
|---|---|---|---|
| 935,397 | 9/1909 | Nikonow | 310/265 |
| 1,237,459 | 8/1917 | Bijur | 310/265 |
| 1,988,039 | 1/1935 | Grob | 310/265 |
| 2,164,738 | 7/1939 | Fraser | 310/265 |
| 2,897,383 | 7/1959 | Barrows | 310/261 |
| 2,994,795 | 8/1961 | Cattabiani | 310/85 |
| 3,359,438 | 12/1967 | Hylen | 310/52 |
| 3,368,091 | 2/1968 | Layman | 310/68 |
| 3,458,738 | 7/1969 | Pohl | 310/64 |
| 3,564,308 | 2/1971 | Ryan | 310/85 |
| 3,588,560 | 6/1971 | Akselsen | 310/265 |
| 3,602,747 | 8/1971 | Stroppa | 310/68 D |
| 3,629,627 | 12/1971 | Dafler | 310/68 D |

FOREIGN PATENTS OR APPLICATIONS

| | | | |
|---|---|---|---|
| 1,263,803 | 12/1959 | France | 310/64 |

Primary Examiner—R. S. Skudy
Attorney, Agent, or Firm—M. P. Williams

[57] ABSTRACT

A high speed, high voltage, square wave voltage, single slot per pole per phase, two phase, saturated rotary field AC generator having a rotary armature exciter, is comprised of non-compressible, rigid rotary coils utilizing oxided metal conductors having coolant fluid flowing therethrough, at least one surface of every electrical current conductor in the generator being in contact with flowing coolant fluid. The rotary structure is provided with a complete peripheral structural wrapping to oppose the centrifugal force generated in the coils due to high velocity. Rotary diodes between an exciter armature and the main generator, rotary field, a single static DC input and static AC output, and magnetic coupling comprising the sole energy coupling between the stator and the rotor, eliminate the need for slip rings or other electrical conduction through relatively moving parts. One embodiment utilizes turbine-like annular entrance of centrifugal pumping for coolant fluid in the rotary coils; in this embodiment, rotating diodes are mounted on coaxial shaft-like conductors. Another embodiment uses hollow radial conductors to carry coolant fluid, as well as electrical current, to the coils; in this embodiment the radial fluid-containing electrical conductors are terminated in annular junctions connected to annular diode housings by longitudinal or axial conductors.

6 Claims, 21 Drawing Figures

HIGH SPEED ELECTRIC GENERATOR

BACKGROUND OF THE INVENTION

1. Field of Invention

This invention relates to high power generators and more particularly to a high speed, high power, high voltage AC generator.

2. Description of the Prior Art

In many applications, such as onboard commercial and military aircraft, there is a need to supply DC generators; some recent technological advances in avionics such as radar require high voltage generators. It is desirous to provide a generator which can be driven directly off the shaft of a turbine, which generally reaches speeds higher than those normally applied to generators. Turbines which typically may be utilized to drive such a generator in an airborne environment may reach revolutions on the order of 24,000 RPM. A 400 cycle generator could theoretically be operated with two poles at 24,000 RPM. However, 400 cycle generators known to the art are incapable of withstanding the centrifugal pressures which result from rotating at 24,000 RPM. One of the problems is that any generator requires two slots per pole per phase, with a minimum of two poles, so that a three phase sinusoidal generator requires at least 12 slots in the armature (whether the armature be rotating or stationary). When high voltage is required, the high voltage may be generated directly in the armature itself, which requires excessive insulation in the armature, which can approach a situation where the slots are so full of insulation that there is barely any room for any coils therein. On the other hand, the more common approach is to utilize low voltage sinusoidal current generation, the current being passed through a transformer to step it up to high voltage, followed by rectification. This of course requires the addition of heavy and bulky transformers to achieve the high voltage. In designing a generator for airborne application, a desirable feature is a minimum amount of backiron therein, to minimize weight. As is known, the amount of backiron required in the generator is inverse to the number of poles which are utilized, and therefore inverse to frequency. Also, the higher the frequency, the less filtering will be required, and the less iron is needed in the step-up transformer if any. In order to achieve a lesser amount of total iron (backiron, transformer, filter) one would increase the number of poles. However, an increase in the number of poles requires an increase in the number of slots so that the size of the generator must be increased in order to provide adequate room for the slots; again, if high voltage is required, then a bulk of insulation is required in each of the slots which further compounds the problem.

Further, use of rectified sinusoidal current requires heavy inductors and large capacitors for adequate filtering of the rectified wave, whenever a high quality DC source is required.

Therefore, generators known to the prior art have been unable to properly accommodate the concurrent desired design parameters of high shaft speed, high voltage, and low weight and bulk.

SUMMARY OF INVENTION

The object of the present invention is to provide significant improvements in alternators capable of use in deriving high voltage DC electrical power.

According to the present invention, an AC generator employs one slot per pole, per phase, thereby deriving a square wave voltage output, which rectifies perfectly for zero ripple DC, and provides a triangular current waveform, there being utilized two phases, whereby the two phase triangular current ring waveform rectifies substantially perfectly to a zero ripple DC current. Allowing the iron to magnetically saturate permits use of less iron, for lighter construction.

In accordance further with the present invention, non-organic, non-plastic insulation, such as metal conductors having oxide surfaces, are utilized as conductors in the rotating coils of a rotary dynamo-electric machine, thereby to eliminate any creeping, compression, expansion, or cold flow in the coils as a result of high stresses provided thereto by heat, coolant fluid pressures, and centrifugal force from high rotary speed. The rotating coils of the machine are substantially rigid, and capable of long life-cycling at high speeds without material alteration in the dimensions thereof.

In accordance still further with the invention, a rotating coil structure of a dynamo-electric machine is completely wrapped about its periphery with tension material to resist all radially outward forces generated by the coils; in one embodiment, both the rotary armature of an exciter and the rotary field of a high voltage AC generator, coupled thereto through rotating rectifiers on a common shaft, are wrapped for radial tensile strength. The wrap may comprise resin-impregnated, prestressed fiberglass or a composite filament wrap, such as epoxy impregnated boron filament.

According still further to the present invention, all of the electrical conductors in a high power dynamo-electric machine have coolant fluid flowing over at least a surface thereof, thereby permitting operation of the machine with extremely high current density relative to the size and weight of the machine.

In accordance with one embodiment of the invention, radial flow of coolant fluid from substantially the axis of the machine is achieved with hollow radial electrical conductors connecting the rotating coils of the machine to each other through rectification means. In one form of this embodiment, rectification diodes between an exciter armature and a generator field are disposed about the shaft of the machine in annular diode housings to which current is conducted through fluid-containing, hollow electrical conductors disposed about the shaft and parallel thereto, from annular junction members into which the radial fluid-containing rotary coil conductors are disposed.

In accordance with another embodiment of the present invention, stationary jets of coolant flow are positioned in proximity with turbine-like blades or vanes which pump the coolant through the rotating coils of the device as a result of rotation of the vanes with respect to the coolant injected thereto, the coolant flowing through the coil impinging on counter-oriented vanes to retrieve the work done thereon. In one form of this embodiment, rotating rectifiers between an exciter armature and a generator field are respectively mounted on each of two coaxial shaft-like conductors, and conduction is made between the coaxial conductors and the rotating coils through solid or spoked disks.

In still further accord with the present invention, a rigid, rotary armature arrangement comprises tiered coils, with one set of coils located completely radially inwardly from the other set of coils.

The various aspects of the present invention contribute to a high speed high power alternator capable of rectification to DC power in the tens of kilovolt and megawatt range, while requiring structure on the order of one tenth of a pound per kilowatt. Alternators employing features of the present invention may be fabricated utilizing known technology, in a wide range of alternatives to suit a variety of design requirements.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 3b is a developed, radial sectional view of a high voltage alternator in accordance with the embodiment of FIG. 3a;

FIG. 4a is a combined schematic and illustrative diagram of electrical connections in the embodiment of FIGS. 3a and 3b;

FIG. 4b is a simple schematic diagram of the electrical connection of FIGS. 3a–4a;

FIG. 5 is a partial sectional view of the exciter taken on the line 5—5 in FIG. 3a;

FIG. 11 is a simplified, schematicized section taken on the line 11—11 in FIG. 3a;

FIG. 15 is an elevated view of manifold structure;

DESCRIPTION OF THE PREFERRED EMBODIMENT

Figures 1, 2, 3A:
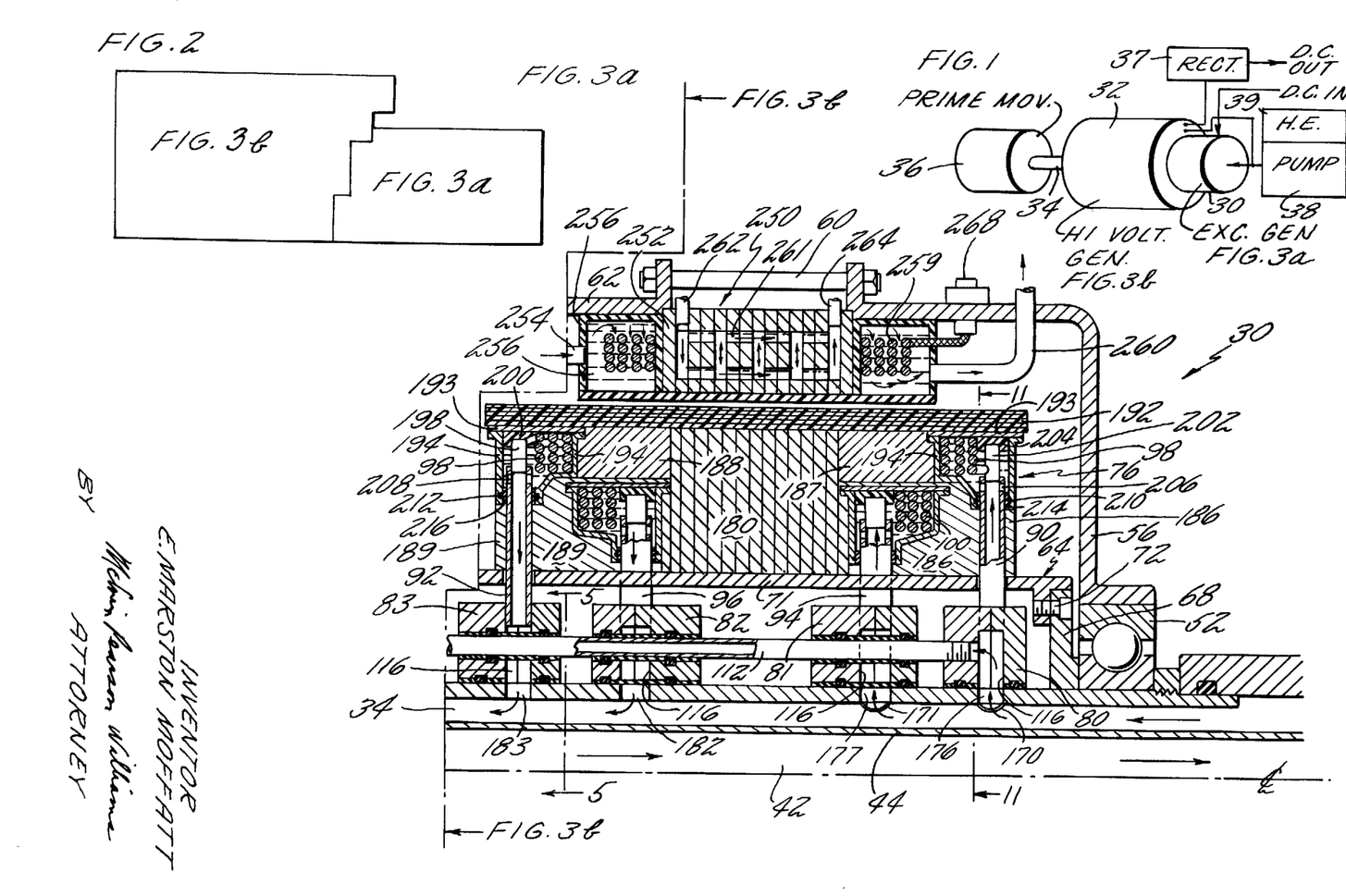
FIG. 1 is a schematicized, side elevation view of a system incorporating the present invention.
FIG. 2 is an illustration of the arrangement of FIG. 3a and FIG. 3b.
FIG. 3a is a developed, radial sectional view of an AC exciter generator in accordance with one embodiment of the present invention.
Figure 3B:
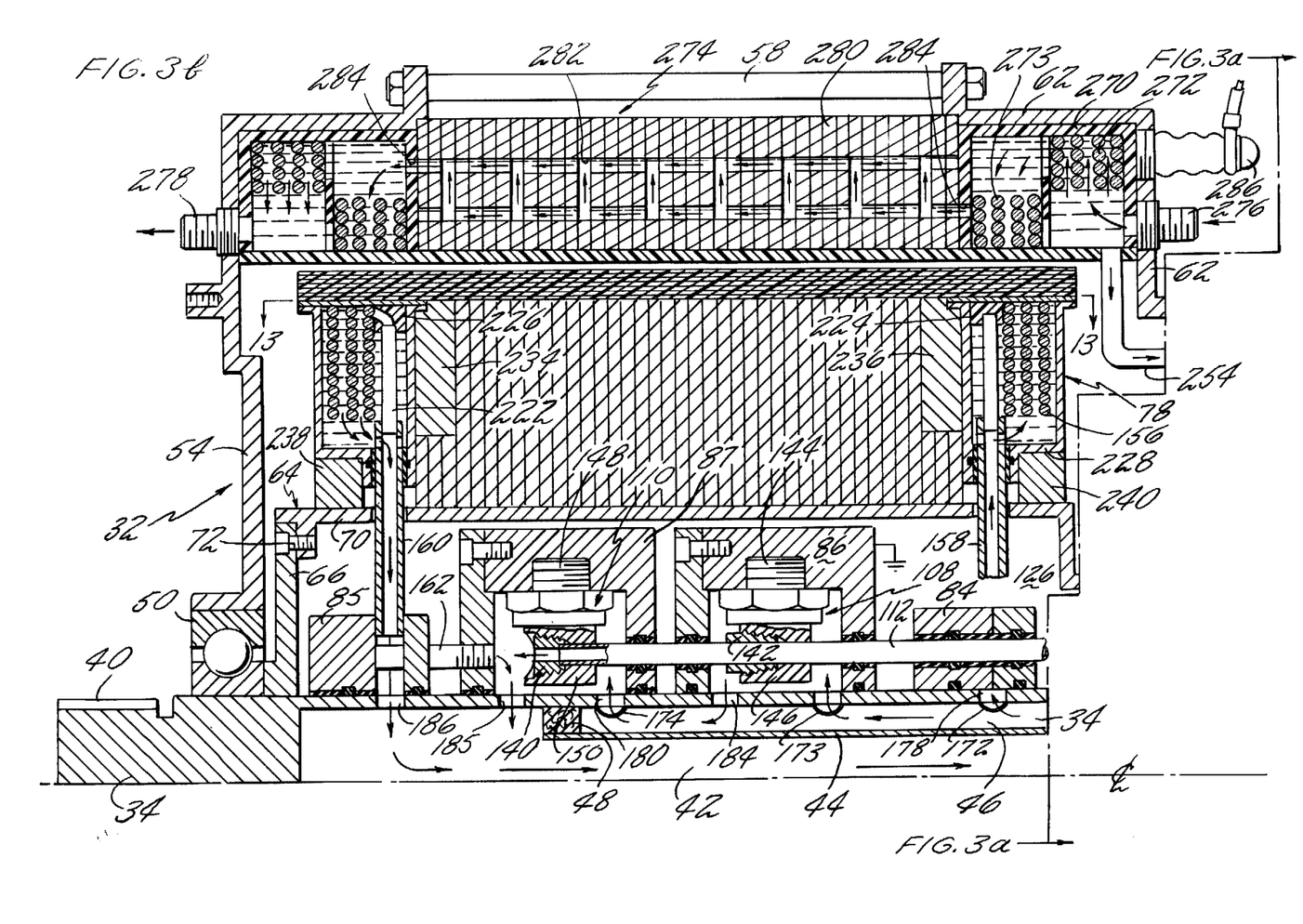

Referring now to FIG. 1, an embodiment of the present invention comprises an excitation generator 30 which generates current to operate the rotating field of a high voltage generator 32, both generators being driven on a common shaft 34 by prime mover 36, which may comprise a motor, a turbine, or a gear box driven by a primary or auxiliary turbine in an aircraft environment. The high voltage output is converted to DC by rectifiers 37. Cooling fluid, which may typically comprise a suitable transformer oil or water, is provided by a suitable source, such as a pump 38 and a heat exchanger 39 to cool both generators 30, 32. The details of the exciter 30 are illustrated in FIGS. 3a and FIGS. 4–11, and the details of the high voltage generator 32 are illustrated in FIGS. 3b, 4, 12 and 13. The relationship between FIG. 3a and FIG. 3b is illustrated in FIG. 2. FIGS. 3a and 3b comprise developed radial sections, it being understood that the configurations are generally symmetrical about the center line, which appears at the bottom of FIGS. 3a and 3b.

Referring now to FIG. 3b, the main shaft 34 may include a key way or slot 40 to engage the matching shaft on the prime mover 36. The shaft 34 is hollow so as to provide a fluid return path 42, and has a tube 44 disposed coaxially therein which is sealed so as to provide a second fluid flow path 46. The inner pipe 44 is static, and does not rotate with the main shaft 34. This pipe may be supported at its right hand end (as seen in FIGS. 3a and 3b) by the pump 38, and is supported at its left hand end by a seal 48, the structure and material of which varies in dependence upon choice of design parameters and the particular coolant fluid being utilized. The seal 48 may comprise a sealed bearing, which, although it allows a little leakage, would not effect operation of this embodiment of the invention. Otherwise, a ring made out of suitable material may be properly journaled in either the tube 44 or the shaft 34, allowing relative rotary shear between the seal 48 and either the tube 44 or the shaft 34 as desired. This embodiment, the stators of both generators 30, 32 are in a single unitary housing which is journaled to the shaft 34 by suitable bearings 50 (FIG. 3b) 52 (FIG. 3a). The bearings 50, 52 are similarly journaled to bell housing members 54, 56, both of which are connected by suitable bolts 58, 60 to an intermediate, stepped annular housing member 62. A rotor mounting drum 64 comprising a pair of end plates 66, 68 and a dual-diameter cylindrical portion 70, 71, which may be secured together by suitable bolts 72, is rigidly disposed on the shaft 34, such as by shrink fitting. Although thermal shrink fitting may be used, it may be preferable to use centrifugal shrink fitting since the latter method leaves fewer undetermined stresses in the materials. Disposed on the rotor mounting drum 64 is a rotary armature assembly 76 of the exciter 30 and a rotary field structure 78 of the generator 32.

Figures 4A, 4B, 15:
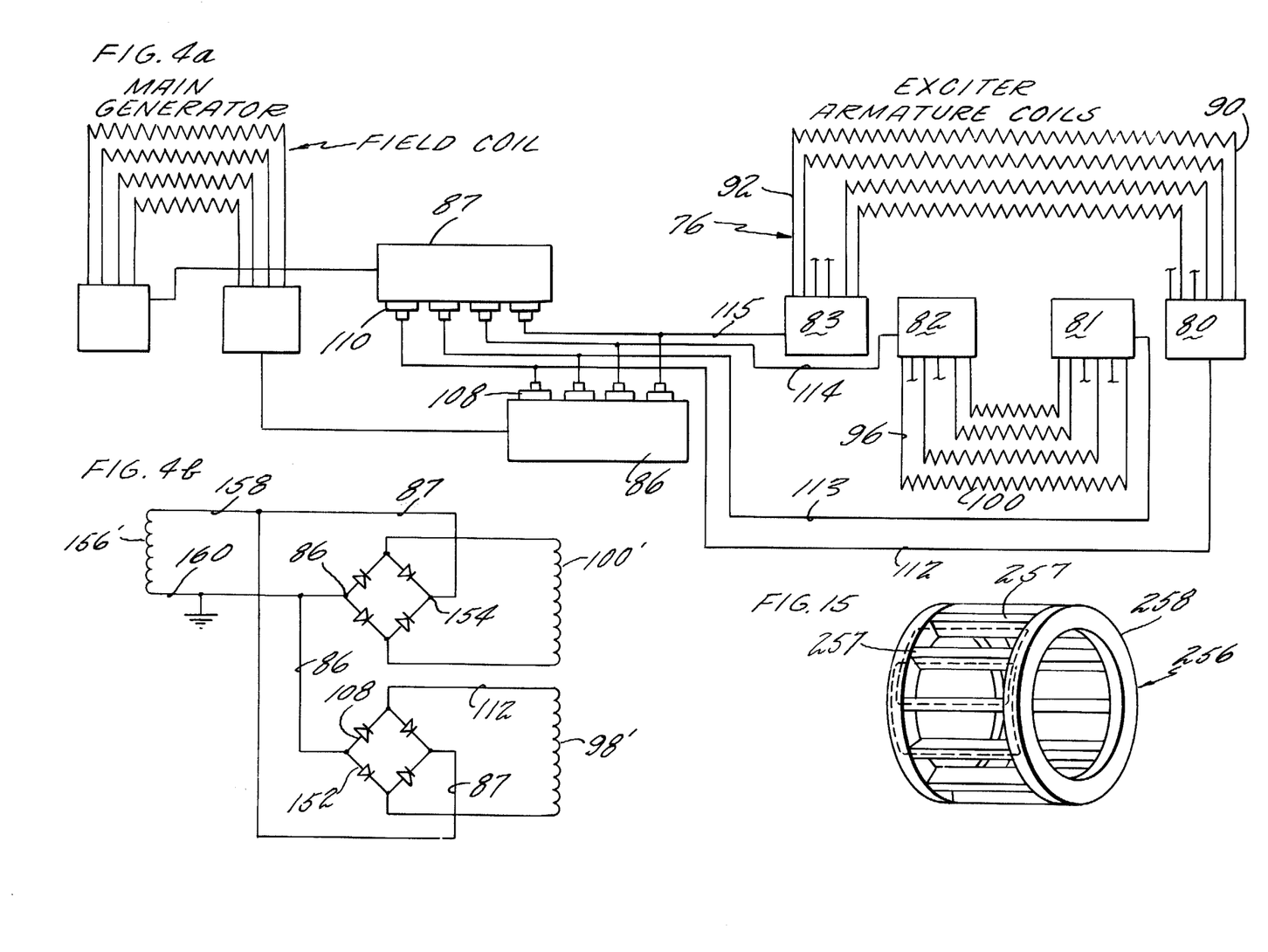
Figure 5:
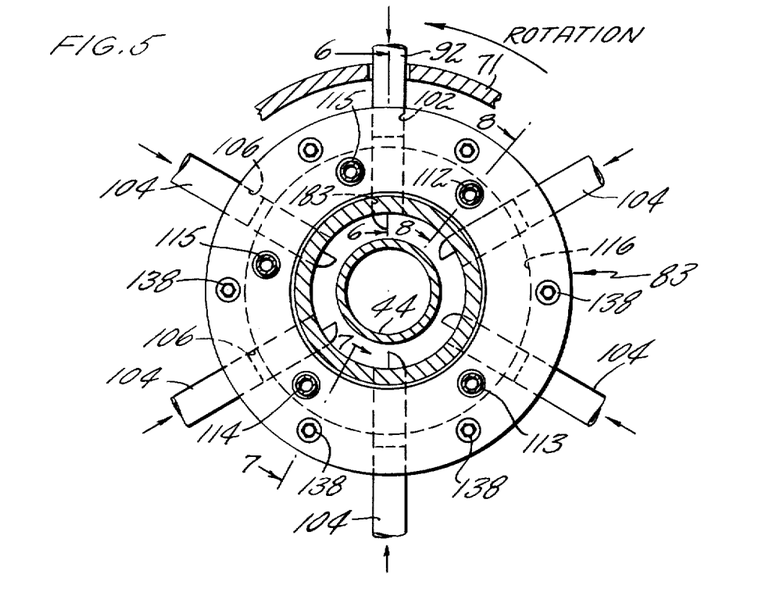
Figure 6:
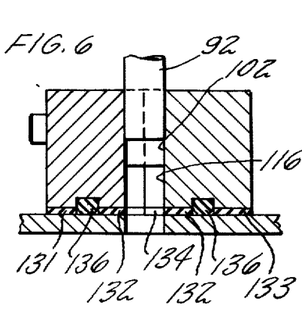
FIGS. 6–8 are detailed partial sections taken on respective lines in FIG. 5.
Figure 7:
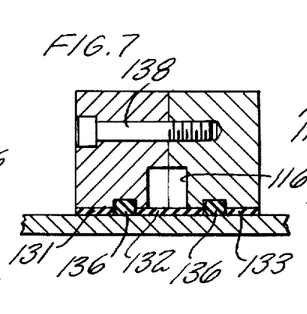
Figure 8:
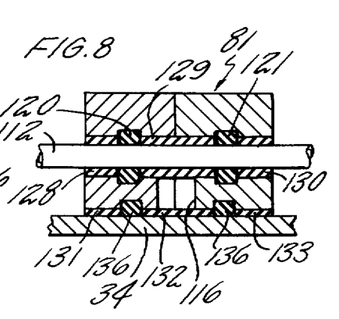
Figure 9:
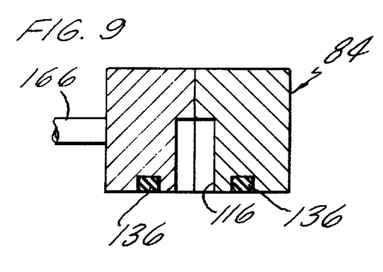
FIGS. 9 and 10 are partial detailed sections of portions of the embodiment of FIG. 3b.
Figure 10:
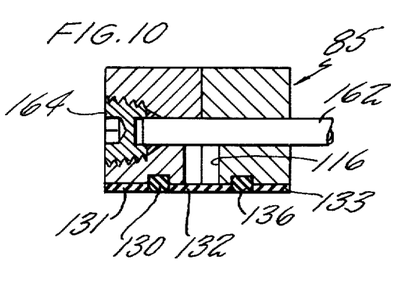

Disposed directly on the shaft 34 and rotating therewith, within the rotor mounting drum 64 are a plurality of annular members 80–87, the members 80–83 comprise junction members which provide electrical connection to the rotating armature 76 of the exciter 30, the members 84, 85 comprise junction members which provide conduction to the rotating field 78 of the high voltage generator 32, and the annular members 86, 87 comprise diode housings. The electrical connections per se are illustrated in FIGS. 4a and 4b. Therein, it can be seen that the coils of the rotating armature 76, such as coils 98, 100 are connected through conductors, such as conductors 90, 92, 94, 96 to respective annular junction members 80, 83, and 81, 82. As illustrated in FIG. 4, this embodiment of the invention contemplates the utilization of six coils in each of two phases. Each of the annular junction members 80–83 has a plurality of the radially extending conductors (90–96) each going to a different coil (such as the coils 98, 100). This is illustrated more clearly in FIG. 5, wherein the conductor 92 is slip fit into a radial hole 102 drilled in the annular junction member 82. Five other conductors 104 are each to be slip fit into related holes 106. The rotating armature 76 is described more fully hereinafter. Each of the annular junction members 80–83 is connected to a respective pair of rectifiers, such as diodes 108, 110 (FIG. 3b), by respective hollow conductors such as pipes 112–115. The conductor 112 which joins the annular junction member 80 with the diodes 108, 110 passes through each of the annular junction members 81–83, in a manner which is illustrated in more detail in FIG. 8, which shows a section of the annular junction member 81 at the point where the conductor 112 passes through. Therein it is seen that a pair of seals such as O-rings 120, 121 are disposed in annular slots to provide a fluid seal with respect to an annular slot 116 longitudinally aligned with the holes into which the radial conductors 90–92 are fitted. Each of the annular junction members 80–85 have the annular slots 116, so as to have fluid communication into the conductors 112–115 from the radial holes (102, 106). This is necessary since the conductors 112–115 cannot be placed in the same radial plane with one of the radial pipes (ie., the radial conductor 90 cannot align with the conductor 112 as seen in FIG. 3a), due to the fact that the conductors 90 and 94 must be radially aligned with the conductors 92 and 96, respectively in order to allow uniform, radial construction of rigid armature coils 98, 100. If an attempt were made to have the conductors related to the annular junction member 80 angularly displaced from those related to the member 81, in turn angularly displaced from those of members 82 and 83, it would be extremely difficult to provide a fluid seal so that fluid within the annular slot 124 does not leak past the conductor 112 into a void 126 formed between the rotor mounting drum 64 and the main shaft 34. In addition, if the conductors 80–92 are not radial, non-radial stresses would build up in the rotary armature as a result of high coolant fluid pressure from centrifugal force. Since each of the members 80–83 comprises one end of a coil, all of which are at different potentials, the conductor 112 is insulated from the annular junction member 81 (FIG. 8) by insulating sleeves 128–30 which may suitably be glued to the member 81, and in a similar fashion is insulated from the members 82–84. Each of the annular junction members 80–83 and 85 is insulated from the main shaft 34 by means of insulating sleeves 131–133 in a manner illustrated in FIGS. 3a and 3b and shown in more detail in FIGS. 6–8 and 10. However, as is illustrated in FIG. 9, the member 84 need not be insulated since it operates at ground potential, as is described more fully hereinafter. In addition, however, each of the members 80–85 is provided with suitable seals such as O-rings 136 to prevent fluid from the annular slots within the members 84 from leaking into the void 126 between the rotor support drum 70 and the main shaft 34. Each of the members 80–85 may preferably be made of two parts fastened together by suitable means such as bolts 138 as illustrated in FIGS. 5 and 7. Each of the conductors 112–115 may be threaded into the related member 80–83 at its right hand end as seen in FIG. 3a, and may be terminated in a related diode (such as diode 110) within the annular diode housing member 87 by means of a suitable compression collet 140. In addition, each of the conductors 112–115 may be electrically connected to diodes (such as diode 108) within the annular diode housing member 85 by means of feed-through compression collet 142. Each of the diodes (such as diode 108) within the annular junction member 86 is provided with its anode at a threaded base 144 and its cathode at the collet end 146 thereof. On the other hand, each of the diodes (such as the diode 110) within the annular support member 87 is provided with its cathode at a threaded base 148 and its anode in the collet receiving end 150 thereof. In the present embodiment, it is simply assumed that there are four rectifiers within each of the annular diode housing members 86, 87, although more may be provided if desired for suitable current carrying capacity. Since each of the conductors 112 is in electrical contact with the cathode of a rectifier in the member 86 and with the anode of a rectifier in the member 87, the diodes are arranged as shown in FIGS. 4a, although they are radially disposed in quadrature about the respective annular members 86, 87. As illustrated in FIG. 4b, this arrangement provides two bridges 152, 154 for each of two phases of the exciter armature, 98' (including in this embodiment the coil 98 and the five coils associated therewith), and 100' (including in this embodiment the coil 100 and the other five coils associated therewith). The bridges 152, 154 rectify the current developed by the exciter for application to the windings 156' of the rotary field 78 of the high voltage generator.

Referring to FIG. 3b, conduction between the winding 156 (and related windings 156' not illustrated therein) and the rectifiers, such as rectifiers 108, 110, is similarly made by hollow conductors 158, 160. The member 87 is connected to the member 85 by at least one hollow conductor 162, but more may be provided symmetrically about the annular members 85, 87 if desired. The conductor 162 is terminated within the member 87 by threading, and terminated in the member 85 by means of a compression collet 164, as is illustrated in more detail in FIG. 10. On the other hand, conduction between the member 86 and conductors 158 is effected through the main shaft 34, which is considered ground in this embodiment, so that no conductors similar to the conductor 162 are required. The general cross sectional configuration of the member 84 is as illustrated in FIG. 9.

Flow of coolant fluid in the void 36 formed between the main shaft 34 and the coolant tube 44 is assisted by means of scoops such as the scoops 170–174 disposed adjacent related holes 176, 180 in the main shaft 34 and by similarly, but oppositely disposed scoops disposed adjacent holes 182–186 in the main shaft 34 (not shown). Thus as the main shaft 34 rotates (in the direction which is out of the page as illustrated in FIGS. 3a and 3b, and counterclockwise as seen in FIG. 5), the scoops 170–174 oppose the shear of the fluid on the inside surface of the shaft 134 thus causing fluid to be scooped into the holes 176–180 which correspond therewith, and into the related members 80, 81, 84, 86 and 87. Oppositely disposed scoops provided on members 82, 83 and 86, 87 and 85 utilize the rotation of the main shaft to create a vacuum and draw fluid out of these members. In addition, since the current carried in the rotating coils of the armature 76 and the field 78 heats the coolant fluid to a considerable extent, there is a centrifugal pumping of the cold more dense fluid outwardly to the area of the coils where the fluid is warmed and is therefore less dense, so there is a net pressure gradient from each entrance (such as the hole 176) to its related exit (such as the hole 183). If the coils start to get warmer, a greater pressure results and more coolant flows. Thus, there is a self regulatory, self pumping action provided by means of completely radial fluid exchange between the cooler source and the warmer sink. In fact, in many implementations of the present invention, pumping of the fluid between the void 46 and the void 42 by means of an external pump such as the pump 38 (FIG. 1) may not be necessary. Indentations in the main shaft 34 may be used in place of scoops if desired.

Figure 11:
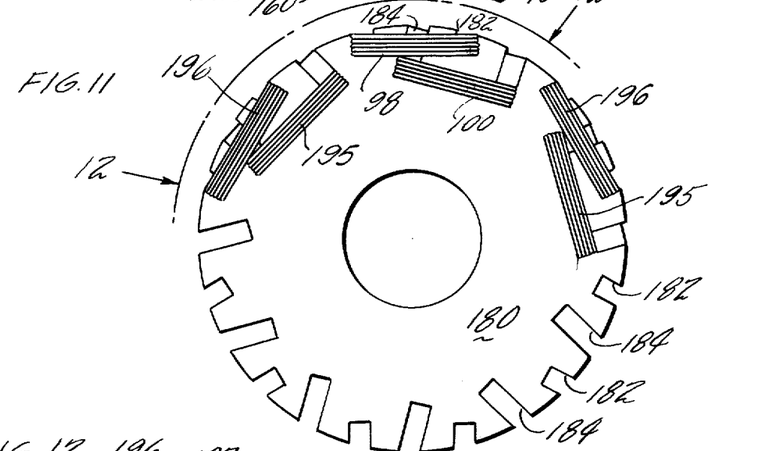
Figure 12:
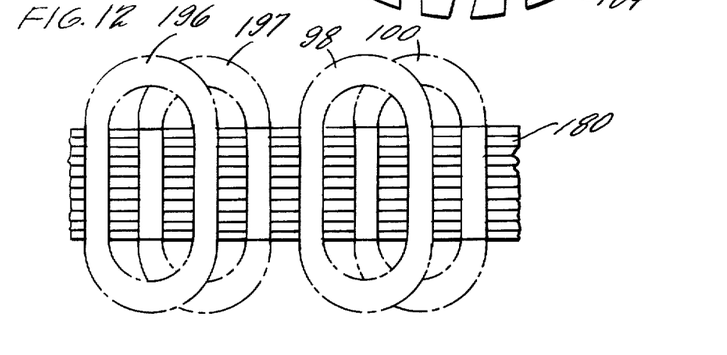
FIG. 12 is a simplified, developed, partial peripheral view taken on the line 12—12 in FIG. 11.

Consider now the remaining rotary structure of the excitation generator or exciter 30. As is known, the basic structure comprises a hollow cylinder of laminated backiron 180 which is provided with slots 182, 184 (FIG. 11). The slots 184 are deeper than the slots 182 so as to permit the coils 100 to be disposed completely radially inward from the coils 98. This is necessary since, as is described more fully hereinafter, each of the coils 98, 100 in accordance with this embodiment of the invention is a rigid structure so that the conventional rope-like interweaving of armature coils cannot readily be achieved herein, while at the same time, the well-known overlapped coil arrangement illustrated in FIG. 12 is necessarily maintained. At each end of the armature 76, beyond the extent of the backiron 180, filler blocks 186–189 are inserted so as to transmit rotational radial stress outwardly to the total armature wrap 192 which is wrapped circumferentially around the armature 76 so as to restrain it from radially outward growth as a result of high centrifugal forces resulting from high rotary speed. The wrap 192 may comprise plastic impregnated, pre-stressed fiberglass, or may preferentially comprise boron filament wrapped on the armature 76 while it is rotating and sprayed with liquid aluminum. The filler blocks resist radially inward forces as pre-stressed wrap is applied. The filler blocks 186–189 may comprise any suitable material, such as aluminum, the only requirement being the radial structural compression strength, there being no significant magnetic effect at these positions within the armature 180.

Each of the coils 98, 100 (and additional coils, such as coils 195, 196 shown in FIG. 11) is prefabricated as a rigid structure before being mounted on the armature assembly 76. The coil assembly 98 is fabricated within a box or coil can structure comprised of a pair of thin pieces of stainless steel 193, 194, the piece 194 being of a general configuration similar to an annular bath tub and the piece 194 being a flat, generally elongated, oval cover which may be metallurgically bonded, such as welded, to the piece 194. As shown, the pieces 193, 194 are butt welded at edges formed by a flange in the piece 194 so as to keep the welding heat as far from the coils and other structure as possible. Within the can 193, 194 the solid conductor which comprises the coil 98 is rigidly disposed. This conductor may be welded at one end to a conductive plug 198 inserted in the open end of the tube 92, the plug being supported by an insulating spacer 200. Similarly, the other end of the conductor which forms the coil 98 may be bonded, such as by welding, to a conductive plug 202 which is inserted into the open end of the conductor 90 and supported by an insulating spacer 204. Each of the conductors 90, 92 have a respective hole 206, 208 drilled completely therethrough near the open end of the tube, and just below the related plug 202, 198, to allow fluid to flow from and into the conductors 90, 92 respectively. This cooling fluid is provided into the intersteces between the segments of conductor forming the coil 98 and can flow from one end of the coil to the other through these intersteces. The void beneath the insulating spacers 200, 204 at each end of the coil 98 provide a manifold for conducting fluid to and from the intersteces between the conductors and the coil 98. An O-ring 210, 212 is respectively provided between each of the conductors 90, 92 and the related ends of the can 193, 194 to provide a fluid seal at the point where each conductor enters the can, and are similarly provided with insulating sleeves 114, 116 thereat. Structure relating to the coil 100 may be substantially identical to that of the coil 98, with the exception of the fact that the relative positions of the conductors 94, 96 with respect to the ends of the coil 100 are reversed from those relating to the coil 98. This is done so as to provide greater spacing between the annular junction members 80, 81 and between the members 82, 83. An alternative to the construction of the armature 76, which may be preferred due to easier manufacture in some instances, may utilize can structures which are similar to an elongated flat spool with top and bottom annular pieces joined by an elongated or generally oval hollow cylinder structure (generally not unlike an adhesive tape spool which is elongated in one direction perpendicular to its axis). After the coil is wound therein, a circumferential cover plate joining both of the annular plates may be metallurgically bonded thereto. However, the details of construction of the can itself is not important: the significant point is that the conductors be solidly packed metal structure with no resins, or other plastic material which could compress or cold flow under stress and heat. In one embodiment of the invention, the solid conductors forming the coils 98, 100 may preferably comprise annodized aluminum, wherein the aluminum oxide provides structural strenth and electrical insulation. In fabrication of the coils themselves, in the form illustrated in FIG. 3a, they may be radially compressed after being wound, so as to take out all play prior to closing up the can, and the excess play is preferably shimmed with any suitable metal oxide which will provide compressive strength and electrical insulation.

Figure 13:
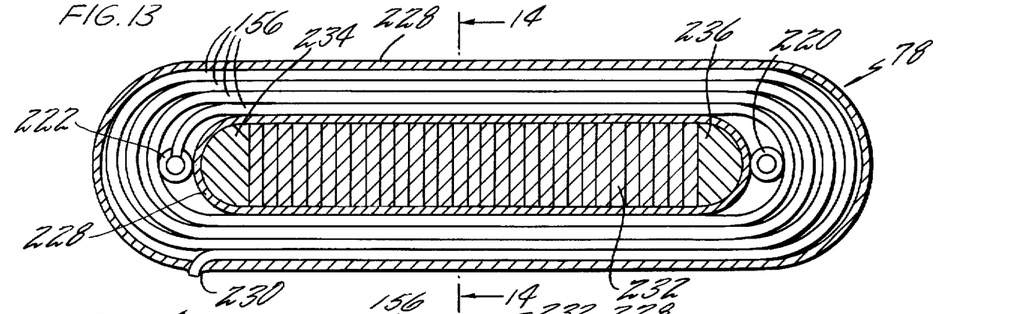
FIG. 13 is a top sectional view of a single coil taken on the line 13—13 in FIG. 3b.
Figure 14:
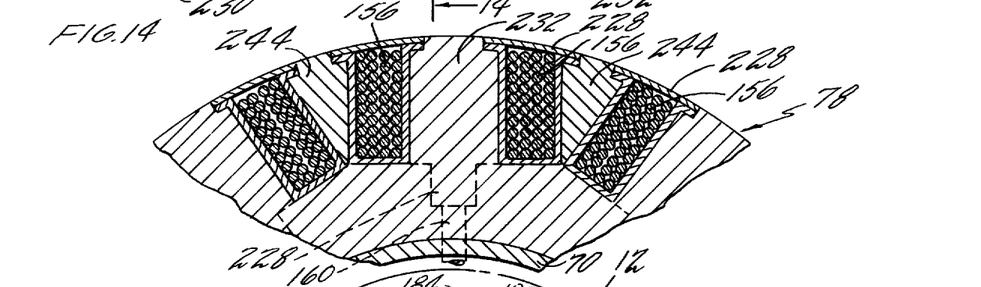
FIG. 14 is a simplified sectional elevation view taken on the line 14—14 in FIG. 13.

The rotating field of the high voltage generator 32 as seen in FIG. 3b is similar in many respects to the armature 76 described hereinbefore. However, as is illustrated in FIGS. 13 and 14, there are some differences. Into the ends of each of the radial, hollow conductors 158, 160 there is inserted a hollow conductor 220, 222, respectively. The conductor 220 is disposed in a conducting spacer block 224 which supports its outward end and connects the conductor 220 to the coil can 228 (described hereinafter). The conductor 222 is disposed within a hollowed out insulating block 226 (not shown in FIGS. 13 and 14 for simplicity). One end of the coil 156 is metallurgically bonded, such as by welding, into the center of the pipe 222, so that the ungrounded output of the rectifiers is applied to that end. The other end of the coil may be metallurgically bonded to the case or can 228 which completely encloses the coil 156 (in a manner similar to the can 193, 194 as described hereinbefore) at a point 230, as is illustrated at the bottom left of FIG. 13. The cans 228 are supported by the wraps 192, 242, the iron 180, 232 and related filler pieces, except at each end (to the extreme left and extreme right as seen in FIG. 13). In order to prevent the can 228 from bursting as a result of high fluid pressure therein, the can 228 may comprise a composite material of boron filament or the like, or may be wrapped in the same fashion as the circumferential wraps 192, 242. The same applies to the cans 193, 194 of FIG. 3a.

The backiron 232 of the rotary field 78 is provided with irregularly shaped notches, as illustrated in FIG. 14, in order to receive the coil cans 228 of the respective field coils 156. The poles about which the coils are placed are notched as illustrated in FIGS. 3b and 13 so as to facilitate insertion of the coil cans over the poles. The notches are filled with metallic spacer pieces 234, 236 so as to supply longitudinal force resistance (as seen in FIG. 13) as a result of the high pressure of the cooling fluid at the ends of the windings, which would otherwise tend to collapse the coil can 228 at each end. Additional spacers 238, 240 (FIG. 3b) may be provided if desired to support radially inward forces which may result from prestressing a wrap 242 (of the same sort as the wrap 192 described hereinbefore), if a prestressed wrap is used in any given utilization of the present invention. The spacers 238, 240 would comprise, in this embodiment, annular rings having notches spaced thereabout to permit passage of the conductors 158, 160, and the adjacent bottoms of the coil can 228, therethrough. As seen in FIG. 14, additional spacers 244 may be provided in each slot between the coil cans 228 of adjacent field windings 156.

Thus the rotary armature 76 and the rotary field 78 are seen to be rigid structures utilizing only noncompressible inelastic material, with the possible exception of the outer wraps 192, 242 of each of the rotary members. Thus, at any speed, the device will expand elastically due to radial and tangential stresses induced by the centrifugal force of rotation, but the fiber wrapping is designed to expand less than the rotor backiron so the coils are always positively held in place in the notches between the poles and hence will not move away from the iron and cause an unbalanced force which could destroy the rotor. Since the structure is radially symmetric, the elastic deformations are symmetric about the axis and do not create any unbalanced forces. The coils are relatively rigid and nonplastic due to the fact that the windings comprise oxided metal which are tightly packed and shimmed where necessary as described hereinbefore. Since the wraps 192, 242 accommodate all of the radially outward forces as a result of high rotary speed which may be imparted to the coils, there is no need for the coil structures to be tied back to the shaft in a manner to withstand radial tension. This is in contrast with previously known techniques wherein the coils are stabilized radially by being keyed to the iron itself, which not only unduly complicates this structure, and poses additional stresses on the iron to limit the top speed at which the device may be operated. The use of organic insulations results in creep deformation which can end up as a short circuit due to the high compressive force exerted between the coils; and this, together with organic potting material, can give a creep deformation that allows the coils to move radially in an erratic way which destroys the balance of the rotor and induces unbalanced centrifugal forces. In this case however not only are the coils supported substantially independently of the backiron, but the backiron itself derives additional support from the wraps 192, 242 even though the need therefore is less than it is with respect to the windings.

Consider now the stator 250 of the exciter 30, as illustrated in FIG. 3a. Inasmuch as the stator is not rotating, the design thereof may be considerably different from the design of the rotary armature and field described hereinbefore. The stator, with the exception of particular features which are pointed out hereinafter, is designed in accordance with well known practice for a two phase, one coil per-pole, per-phase AC generator. The only distinction is that means are provided in accordance with the invention to cool the stator 250 with a cooling fluid. Specifically, fluid may be received in a fluid conduit 254 and passed into a manifold area 255 formed within a polyimide manifold structure 256 of the type illustrated diagramatically in FIG. 15. The manifold 256 is in the shape of a squirrel cage having two hollow annular members joined by hollow runglike members 257. Fabrication of the stator is accomplished by providing the manifold 256 without annular end covers 258 thereon, and winding the coils (such as coil 259) through the rungs, each coil passing through even or odd numbered rungs and not passing through the inbetween odd or even numbered rungs, respectively, as illustrated in FIG. 15 and in accordance with well known stator winding practice. Of course, the pole pieces fit in the spaces between the rungs 257. Within the manifold 256, cooling fluid can flow within the intersteces of the coil winding 258. The cooling manifold 256 may have suitable coolant outlet means 260 connected thereto to provide a return line to the pump 38 or an additional pump if desired. If desired, the laminations of the backiron 252 may be provided with holes in a selective fashion so as to provide a fluid passageway 261, to which an inlet pipe 262 and an outlet pipe 264 may be connected, for communicating cooling fluid to and from a suitable pump and/or heat exchanger (such as 38 and 39, FIG. 1). The illustration of the cooling passages 261 in FIG. 3a is illustrative merely since it forms no part of the present invention, but may be desirous in an implementation thereof.

Each coil 259 of the stator field 250 preferably comprises relatively flexible wire having a suitable insulating coating, such as polyimide, for high temperature, high voltage insulation. One end of the coil 259 is connected to a DC input terminal 268 which may be connected to any suitable potential to fit the design parameters of the exciter, in accordance with well known technology. The other end of the coil 259 may be passed through a hole (not shown) in the manifold and grounded to the casing 62, 56 of the device, in any suitable fashion.

The input pipe 254 provides fluid to the manifold 256 from a similar manifold 270 relating to the coils 272, 273 of the stationary armature 274 of the high voltage generator 32. The manifold 270 is provided with a suitable coolant fluid inlet 276 and a suitable coolant fluid outlet 278. The armature is two phase, so it differs commensurately from the single phase field of the exciter (which is illustrated in FIG. 3a and described hereinbefore). The iron 280 of the armature may be fashioned of laminations having suitable selected holes therein so as to provide a coolant fluid flow channel 282 therethrough. If desired, holes 284 may be provided in the wall of the manifold to provide inlets and outlets to the coolant fluid channels 282. Thus, the fluid may enter axially as illustrated in FIG. 3b or radially as illustrated in FIG. 3a, in dependence upon design choice in any given implementation of the present invention. If passages are provided in the manifolds 256, 270, some fluid leakage may result, but this would fall to the bottom of the casing where it could be recovered by a suitable pump.

A plurality of high voltage AC output terminals 286, there being two for each phase of the armature in accordance with well known generator technology, may be provided in spaced-apart positions on the casing 62, each being connected to one end of a related coil 272, in a well known fashion. This comprises the high voltage output of the device. The terminals 286 may be connected to a suitable rectifier (37, FIG. 1) in any suitable configuration (such as similar to that illustrated in FIGS. 4a and 4b) for the purpose of rectifying the output to provide a high voltage DC output from the rectifier 37.

A secondary primary embodiment of the present invention is illustrated in FIGS. 16–19. This second embodiment is more suited to smaller machines, having a lower power output and a lower rotary speed. This embodiment is similar to the previously described embodiment in terms of the construction of the stators, the rigid rotating coil structures, and the rotor wrapping which takes the radially outward forces of the coils. However this embodiment differs in the manner in which coolant fluid is provided to the rotating coils, in that it employs a cool fluid pumping system generally of the form of a centrifugal pump with an annular entrance, and since the radial conductors are not utilized for introducing fluid to cool the coils, a different electrical arrangement employing diodes disposed on coaxial rotating members is employed.

Figure 16:
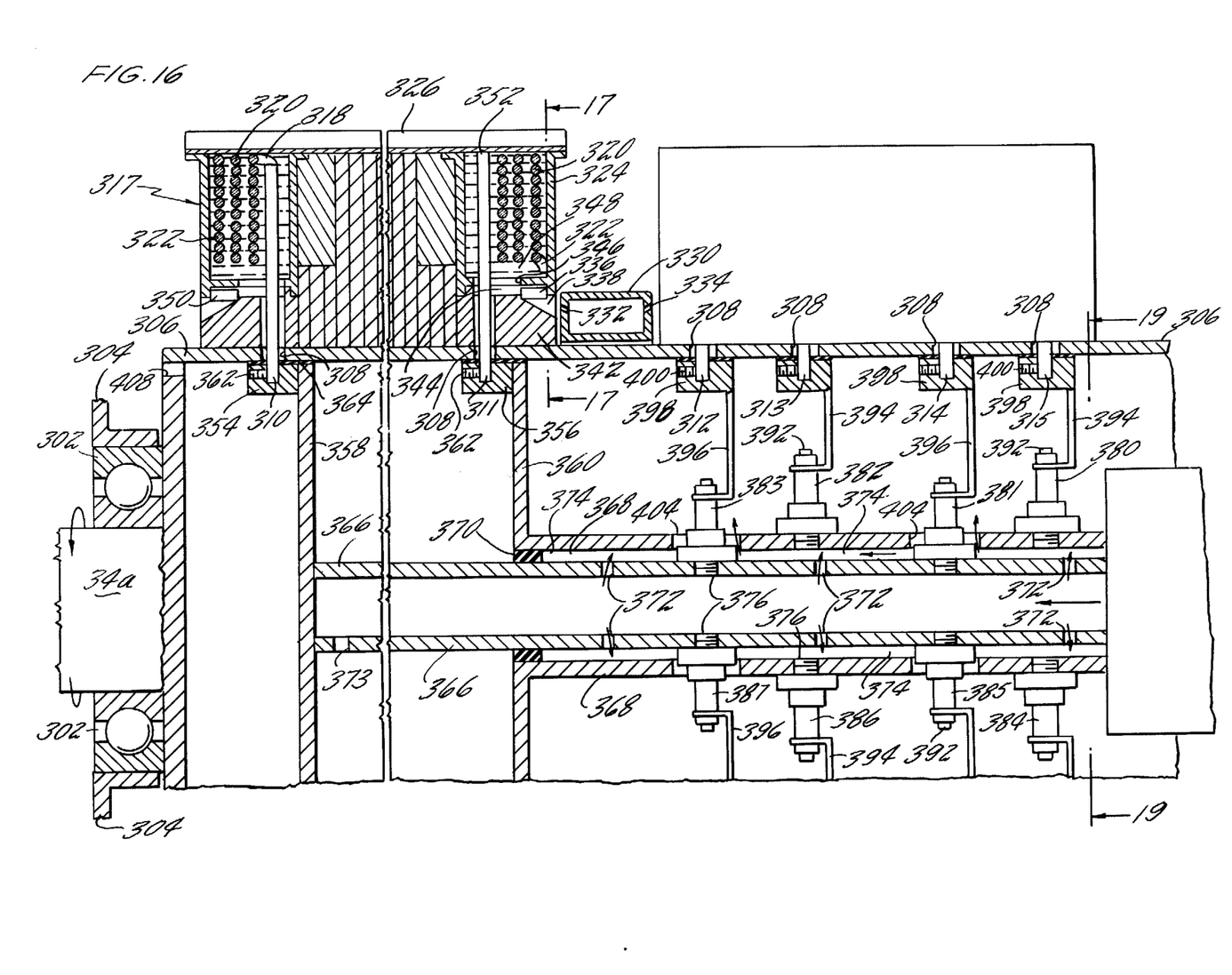
FIG. 16 is a developed radial sectional view of a combined exciter/generator in accordance with a second principal embodiment of the present invention.
Figure 17:
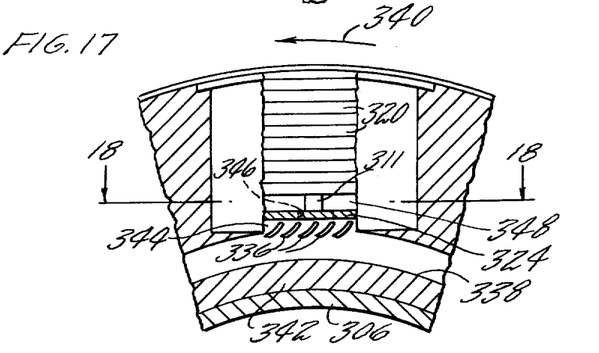
FIG. 17 is a partial, sectioned side elevation view taken on the line 17—17 in FIG. 16.
Figure 18:
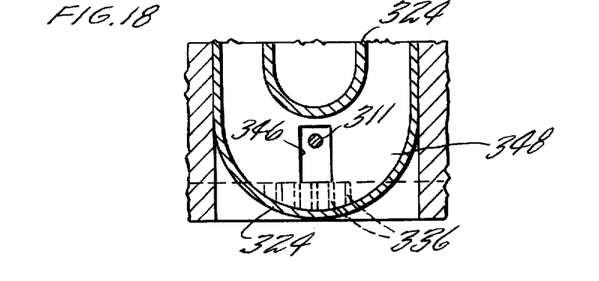
FIG. 18 is a partial, sectioned top view taken on the line 18—18 in FIG. 17.
Figure 19:
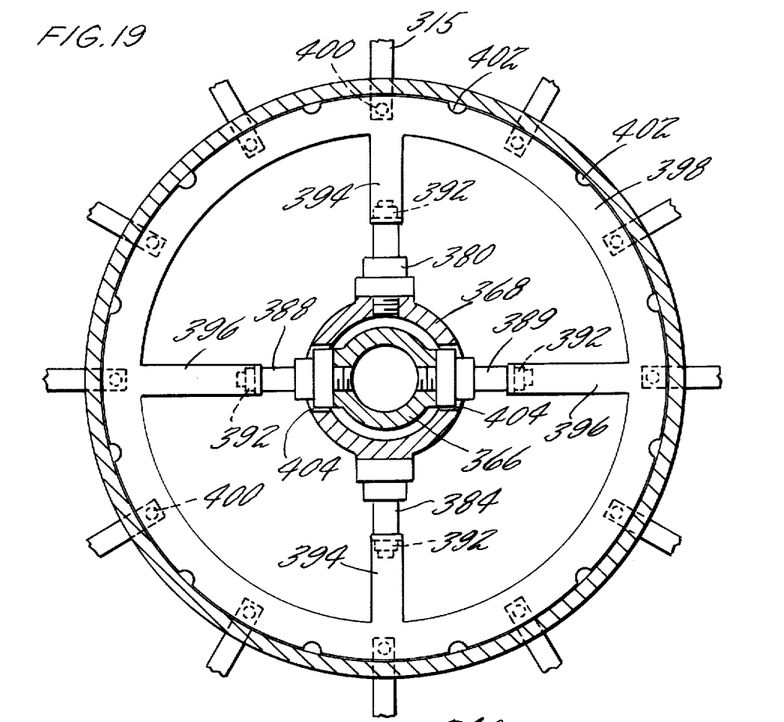
FIG. 19 is a partial, sectioned elevation view of exciter structure taken on the line 19—19 in FIG. 16.

Referring now to FIG. 16, the rotating shaft 34a terminates in a flange or disc portion 300, the shaft 34a and flange being journaled by suitable bearings 302 to casing structure 304 which may be similar to that described with respect to the previous embodiment hereinbefore. The flange or disc portion 300 is joined to a rotary field mounting drum 306 having a plurality of holes (such as the holes 308) therethrough to permit passage of radial conductors 310–315 therethrough. The rotary armature 316 and rotary field 318 are similar to the armature 76 and field 78 described hereinbefore. The conductor 310 is metallurgically bonded to one end 318 of the rotary field coil 320, the other end 322 being metallurgically bonded to a rigid coil can 324, in a fashion similar to that described with respect to FIG. 3b hereinbefore. The rotary field 317 is provided with a radial force resisting wrap 326 which is similar to the wraps 192, 242 described hereinbefore. An important modification of this embodiment is that the coolant fluid for the rotary armature and field 316, 317 is provided by a stationary fluid conduit 330 which is suitably disposed in a stationary fashion on the outer casing 304 of the machine. The conduit 330 is annular in shape, and includes a plurality of holes 332, 334 which may comprise a plurality of closely spaced individual holes, or annular slots with struts to join radially inward and outward portions of the conduit 330. Referring to FIGS. 16, 17 and 18, the rotary field structure 317 includes, at the bottom of each of the coil cans 324, a plurality of turbine-like blades or vanes 336 disposed above a tapered annular slot 338 and oriented with respect to the rotation of the device (which is assumed to be out of the page in FIG. 16 and counterclockwise as illustrated by the arrow 340 in FIG. 16) so that, as the device rotates, the vanes 336 scoop up fluid which is injected into the annular slot 338 through the holes 332 in the conduit 330. Each of the vanes 336 is suitably attached to an annular filler piece 342 which may comprise an annular member, suitably shaped so as to form, with the coil can 324, the tapered annular slot 338. The member 342 may be of any suitable metal. The vanes 336 initially cause the fluid to pass into a void 344 formed between the insert 342 and the bottom of the coil can 324, and then passes upwardly through a slot 346 in the bottom of the coil can 324 into a space 348 beneath the coils 320, within the coil can 324. Thereafter, the fluid will flow through the intersteces between the turns of the coil 320, and will flow outwardly past a plurality of similarly disposed vanes 350 at the axially opposite end of the field 317. The vanes 350 are disposed at an angle opposite to the vanes 336. In operation, mechanical work has to be done on the vanes to scoop up the fluid and accelerate it, but as the fluid leaves the coils and contacts the vanes 350, the contact is in such a direction with respect to the angle of the vanes 350 that the fluid tends to put the work back into the vanes 350 in the same fashion as a turbine, thereby contributing to the work required to rotate the device insofar as pumping of the fluid is concerned. In other words, there is no energy required to pump the fluid except for the losses in the flow path from the vanes 336 to the vanes 350, and the losses at the vanes themselves. The vanes 350 also act to expand the fluid and restore it to the lower pressure which obtains outside the coil structure.

Considering further the electrical arrangements of this embodiment, the grounded end 322 of the field coil 320 is connected through the coil can 324 to the conductor 311 which is metallurgically bonded to a point 352 on the top of the coil can 324. Each of the conductors 310, 311 terminate in a hole drilled in a related one of a pair of seating members 354, 356 which are disposed on related conducting discs 358, 360. The members 354, 356 may comprise small blocks welded at suitable positions about the periphery of the discs 358, 360 at each point where a conductor similar to conductors 310, 311 pass through the drum 306. On the other hand, if desired, these may comprise annular rings with suitable holes drilled therein at the points where the conductors are to be received. The conductors may be suitably locked to the members 354, 356 by set screws 362, or in any other suitable fashion. Since the disc 358 is connected to an ungrounded conductor 310, it, and any related member 354, must be insulated, such as by an insulating sleeve 364 which may be organic or plastic such as epoxy, fiberglass or any other suitable insulation. On the other hand, the disc 360 is at ground potential, and need not be insulated from the drum 306.

The disc 358 is connected to an inner conductor 366 and the disc 360 is connected to an outer conductor 368 disposed coaxially therewith. The conductors 366, 368 may simply comprise hollow pipes of a suitable material such as aluminum. A fluid seal 370 is provided between the conductors 366, 368 so as to control the flow of coolant fluid. In this embodiment, it is assumed that coolant fluid is received under pressure within the inner conductor 366, and passes through holes 372 therein into the space 374 formed between the conductors and the seal 370, and through a hole 373 at the end of the conductor 366. Each of the conductors includes threaded holes 376 into which the bases of respective rectifiers such as diodes, 380–389. As in the previous embodiment, some of the diodes are configured so that the threaded end is an anode and some configured so that the threaded end is a cathode, so as to provide the electrical arrangement of FIG. 4b; all anodes are connected to the outer conductor 368, and all cathodes are connected to the inner conductor 366. Each of the diodes 380–389 is secured by a cap screw 392 to a respective radial arm 394, 396 (FIGS. 16 and 19) extending radially inward from an annular support member 398. The annular support members 398 have radial holes therein to receive the radial conductors 312–315, which are secured thereto by set screws 400 or other suitable means. The radial arms 394 are shorter than the radial arms 396 since the related diodes are joined to the outer conductor 368. Each of the annular support members 398 have fluid flow holes 402 (FIG. 18) formed at the extreme periphery thereof to allow coolant fluid, which is forced radially outward by centrifugal force, to flow from right to left as seen in FIG. 15. Similarly, the discs 360, 368 include fluid flow holes at their extreme peripheries, between the points where the conductors 310, 311 are journaled. Thus, fluid flows within the conductor 366, through the holes 372 into the space 374, through holes 404 in the outer conductor 368 through which the diodes 381, 383, 385, 387, 388, 389 are disposed. The fluid therefore reaches the space between the conductor 368 and the drum 306, and flows through the passage holes 402 into the space between the disc 360 and the disc 358, through additional holes and into the space between the flange or disc 300 and the disc 358. Thereafter, fluid may flow through similar holes 408 disposed about the extreme periphery of the flange or disc 300 and into the inside of the casing 304. The fluid is returned to a heat exchanger or pump in any desired fashion known to the art by being pumped from a sump in the bottom of the casing 304.

Thus the second embodiment of the invention has unique features such as the turbine-like flow of coolant fluid into the rotary coils, and the coaxially disposed main conductors to which the diodes are respectively attached through radial support members. The remaining structure of the embodiment of FIGS. 16–19 may be similar or identical to that shown in the embodiment of FIGS. 3a–15. The electrical connections can be seen to be the same as those described with respect to FIGS. 4a and 4b hereinbefore. Similarly, the exciter armature 316 is a similar adaptation of the exciter armature 76 of FIG. 3a, modified in a manner to receive the coolant fluid from the duct 330 in the same fashion as is the field 317, as described hereinbefore.

Because the embodiments herein utilize one slot per pole per phase, the output voltage of the device is in the form of a square wave. When operating without a load, it is a 50% duty cycle square wave, and under load, becomes a 100 % duty cycle square wave. The current, being in a lag or integral relationship with respect to the voltage due to the inductance of the coils, is triangular in shape. By utilizing two phases, the triangular current, when parametrically rectified, adds to substantially a perfect DC. The voltage is similarly substantially perfect DC as a result of rectification of the square wave voltage output. Therefore, in many applications, it is not even necessary to use any filtering downstream of the rectifier 37 (FIG. 1) for a very high quality DC power output. If some filtering is desired, it can be limited to extremely small components for the purpose of simply removing noise and purifying the quality of the output.

The rotating field coil 156, which must take extremely high stresses as a result of the centrifugal force on the coil structure itself, and as a result of the high pressure in the coolant fluid as a result of centrifugal force, has been described as a rigid structure, preferably composed simply of a multiple turn of solid metallic conductor having an oxide coating thereon. Other configurations to achieve the desired rigid and stress-resisting construction of the embodiments herein may be employed if desired. For instance, the configuration of the conductor within the coil may be circular, oval, rectangular, flat or square. It may be hollow if desired, so that coolant flows within the conductor rather than through intersteces, or both. If the conductor is substantially flat and solid, intersteces may be provided by dimpling the surface of the conductor. If desired, the conductor may have a radial dimension as high as the coil, and a single radial turn would then be utilized. On the other hand, flatened C-shaped pieces may have their ends joined together so as to provide a flatened spiral coil. The coils may even comprise orthogonally aligned hollow pipes bolted together, in which case a rectangular cross section would facilitate joinder of sections thereof into an integral coil structure. Similarly, many other modifications may be made in the coil within the spirit of this aspect of the invention, which is to provide a non-compressible, strong rotary field coil structure.

Thus, although the invention has been shown and described with respect to preferred embodiments thereof, it should be understood by those skilled in the art that the foregoing and various other changes and omissions in the form and detail thereof may be made therein, without departing from the spirit and the scope of the invention.

Having thus described typical embodiments of my invention, that which I claim as new and desire to secure by Letters Patent of the United States is:

1. A rotary dynamo-electric machine comprising:
   a magnetic core having poles and slots thereon and adapted for rotation about the axis of said machine;
   a coil structure including electrical conductor means disposed to conduct current about a pole on said core, said conductor disposed with an exposed surface along substantially all of the differential elements of current carrying portions thereof;
   means disposed along the axis of said machine for providing a source of coolant fluid under pressure; and
   a pair of radial electrical conductor means extending from said fluid source radially outward to said coil structure, each of said conducting means being hollow and adapted to flow coolant fluid from said source to the exposed surfaces of said coil at one end thereof and from the other end of said coil structure back to said source, each conducting means electrically connected to one end of said coil.

2. An alternating current generator comprising:
   a shaft adapted for rotation;
   an input direct current field stator;

a rotary armature disposed for rotation on said shaft in proximity with said field stator, thereby to generate alternating current in said armature;

a static two phase armature having two slots per pole;

a plurality of rotary field coils disposed on said shaft for rotation with said rotary armature in proximity with said static armature; and electric current carrying means disposed on said shaft including rectifier means for rectifying the output of said rotary armature and applying the rectified current thereof to said field coils, whereby said static armature produces two phase AC electric power having square wave voltage and triangular current at the output thereof.

3. A generator system according to claim 2 further comprising second rectification means connected to said static armature for parametrically rectifying the output thereof, the output of said second rectification means comprising direct current power, the voltage and current of which includes substantially no ripple.

4. A rotary dynamo-electric machine comprising:

a rotatable shaft;

a rotary field structure disposed for rotation on said shaft, said structure including a slotted iron core and an electrical coil mounted in a substantially fluid tight can disposed in the slots of said core, said can having an aperture in each of two axially opposed ends thereof;

a stationary annular conduit adapted to receive cooling fluid under pressure, said annular conduit having a plurality of fluid outlet apertures disposed in a radial plane thereof, said conduit disposed adjacent a first one of said ends of said coil structure in a manner so that fluid emanating therefrom impinges on said coil structure; and a plurality of vanes disposed on said coil structure in proximity with said aperture in a manner so that fluid emanating from said conduit impinges on said vanes, and said vanes, when rotating with said field structure, pumping said fluid through said coil structure to the aperture at the second one of said ends thereof.

5. A rotary dynamo-electric machine comprising:

an annular rotary shaft;

a rotary exciter armature and a rotary generator field disposed for rotation on said annular rotary shaft;

a pair of hollow, coaxial conductors disposed on the axis of said machine within the annulus of said shaft, the outer one of said conductors having holes therein to permit access to the inner one thereof, said conductors being rigidly disposed as a unit with said shaft and rotatable therewith;

a plurality of diodes, each of said diodes having a first terminal of a first conductivity type and a second terminal of a second conductivity type, a first group of said diodes mounted to the inner one of said conductors and a second group of said diodes mounted to the outer one of said conductors, each diode connected to the inner one of said conductors having its first terminal connected thereto and each diode connected to the outer one of said conductors having its second terminal connected thereto;

means electrically connecting each end of each coil in said armature to at least one of said first diodes and at least one of said second diodes; and electrical conduction means connecting said coaxial conductors to respective ends of a plurality of coils in said rotary field.

6. A rotary dynamo-electric machine rotor comprising:

a slotted iron core;

means comprising at least one rigid coil assembly mounted in the slots on said core, said coil assembly comprising a plurality of turns of a single conductor of circular cross section, said conductor consisting solely of a surface oxidized conductive metal, the oxide of said metal providing mechanically strong electrical insulation for said coil; and means for flowing a coolant fluid through the interstices between the respective turns of said coil assembly for cooling said conductor.

* * * * *